United States Patent
Ranson et al.

(10) Patent No.: US 10,009,120 B2
(45) Date of Patent: *Jun. 26, 2018

(54) WIDEBAND REMOTE UNIT FOR DISTRIBUTED ANTENNA SYSTEM

(71) Applicant: CommScope Technologies LLC, Hickory, NC (US)

(72) Inventors: Christopher Goodman Ranson, Concord, VA (US); Thomas Kummetz, Kissing (DE); Van E. Hanson, Forest, VA (US); Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/631,798

(22) Filed: Jun. 23, 2017

(65) Prior Publication Data

US 2018/0048397 A1 Feb. 15, 2018

Related U.S. Application Data

(63) Continuation of application No. 14/686,415, filed on Apr. 14, 2015, now Pat. No. 9,705,609.

(Continued)

(51) Int. Cl.
*H04B 15/02* (2006.01)
*H04W 88/08* (2009.01)
*H04B 1/525* (2015.01)

(52) U.S. Cl.
CPC .............. *H04B 15/02* (2013.01); *H04B 1/525* (2013.01); *H04W 88/085* (2013.01)

(58) Field of Classification Search
CPC ...... H04B 15/02; H04B 1/525; H04W 88/085
See application file for complete search history.

(56) References Cited

U.S. PATENT DOCUMENTS

| 5,691,978 A | 11/1997 | Kenworthy |
| 6,169,912 B1 | 1/2001 | Zuckerman |

(Continued)

FOREIGN PATENT DOCUMENTS

| CN | 1440147 | 9/2003 |
| EP | 2642670 | 9/2013 |

(Continued)

OTHER PUBLICATIONS

Estrada, "Improving High Speed Analog to Digital Convertor Dynamic Range by Noise Injection", Jan. 1, 2007, pp. 669-676, Publisher: BAE Systems.

(Continued)

*Primary Examiner* — Mounir Moutaouakil
(74) *Attorney, Agent, or Firm* — Fogg & Powers LLC

(57) ABSTRACT

Certain aspects involve a wideband remote unit. The wideband remote unit can include one or more antennas and an analog-to-digital converter ("ADC"). The antenna can receive wideband signals. The wideband signals can include an uplink RF signal and a leaked downlink RF signal. The uplink RF signal can have an uplink signal power at or near a noise level. The leaked downlink RF signal can have a downlink signal power greater than the uplink signal power. The ADC can convert the received wideband signals to digital RF signals representing the uplink signal and the downlink signal. The wideband remote unit can transmit the digital RF signals to a unit of a DAS that is in communication with a base station.

20 Claims, 6 Drawing Sheets

Related U.S. Application Data

(60) Provisional application No. 61/979,948, filed on Apr. 15, 2014.

(56) References Cited

U.S. PATENT DOCUMENTS

| | | | | |
|---|---|---|---|---|
| 6,472,952 | B1* | 10/2002 | Sakai | H04B 1/18 333/126 |
| 6,532,358 | B1 | 3/2003 | Earls et al. | |
| 6,640,111 | B1 | 10/2003 | Shapira | |
| 6,704,349 | B1 | 3/2004 | Masenten | |
| 6,745,003 | B1 | 6/2004 | Maca et al. | |
| 6,993,287 | B2 | 1/2006 | O'Neill | |
| 7,200,391 | B2 | 4/2007 | Chung et al. | |
| 7,443,829 | B2 | 10/2008 | Rizvi et al. | |
| 7,548,153 | B2 | 6/2009 | Gravelle et al. | |
| 7,555,261 | B2 | 6/2009 | O'Neill | |
| 7,605,755 | B2 | 10/2009 | van Rooyen et al. | |
| 7,623,571 | B2 | 11/2009 | Petre et al. | |
| 7,720,178 | B2 | 5/2010 | Li et al. | |
| 7,756,480 | B2* | 7/2010 | Loh | H04B 1/525 370/277 |
| 7,783,318 | B2 | 8/2010 | Wilson et al. | |
| 7,809,047 | B2 | 10/2010 | Kummetz | |
| 7,876,869 | B1 | 1/2011 | Gupta | |
| 7,961,689 | B2 | 6/2011 | Stratford | |
| 8,175,535 | B2* | 5/2012 | Mu | H04B 1/123 455/283 |
| 8,226,003 | B2* | 7/2012 | Frederick | H04B 1/525 235/451 |
| 8,260,143 | B2 | 9/2012 | Gupta et al. | |
| 8,305,941 | B2 | 11/2012 | Cohen et al. | |
| 8,346,091 | B2 | 1/2013 | Kummetz et al. | |
| 8,457,562 | B2 | 6/2013 | Zavadsky et al. | |
| 8,619,839 | B2 | 12/2013 | Braz et al. | |
| 8,638,214 | B2 | 1/2014 | Kummetz | |
| 8,681,917 | B2 | 3/2014 | McAllister et al. | |
| 8,744,504 | B2 | 6/2014 | Faccin et al. | |
| 8,818,299 | B2 | 8/2014 | Morrison et al. | |
| 9,042,838 | B2* | 5/2015 | Braithwaite | H04B 1/525 455/114.2 |
| 9,203,462 | B2* | 12/2015 | Petrovic | H04B 1/123 |
| 9,209,902 | B2 | 12/2015 | Henry et al. | |
| 9,312,919 | B1 | 4/2016 | Barzegar et al. | |
| 2004/0266338 | A1 | 12/2004 | Rowitch | |
| 2006/0205342 | A1 | 9/2006 | McKay, Sr. et al. | |
| 2007/0049213 | A1 | 3/2007 | Tran | |
| 2008/0057884 | A1 | 3/2008 | Wei et al. | |
| 2008/0198955 | A1 | 8/2008 | Oren et al. | |
| 2008/0200117 | A1 | 8/2008 | Oren et al. | |
| 2009/0041094 | A1 | 2/2009 | Ishii | |
| 2009/0061940 | A1 | 3/2009 | Scheinert et al. | |
| 2009/0075644 | A1 | 3/2009 | Hermel | |
| 2009/0207896 | A1 | 8/2009 | Behzad | |
| 2009/0232510 | A1 | 9/2009 | Gupta et al. | |
| 2009/0238573 | A1 | 9/2009 | Bauman | |
| 2009/0290632 | A1 | 11/2009 | Wegener | |
| 2010/0105340 | A1 | 4/2010 | Weissman | |
| 2010/0118921 | A1 | 5/2010 | Abdelmonem et al. | |
| 2010/0166109 | A1 | 7/2010 | Neumann et al. | |
| 2010/0197231 | A1 | 8/2010 | Kenington | |
| 2010/0261504 | A1 | 10/2010 | Lukkarila | |
| 2010/0278530 | A1 | 11/2010 | Kummetz et al. | |
| 2010/0317386 | A1 | 12/2010 | Da Silva et al. | |
| 2011/0013686 | A1 | 1/2011 | Malladi et al. | |
| 2011/0051790 | A1 | 3/2011 | Honda | |
| 2012/0039254 | A1 | 2/2012 | Stapleton et al. | |
| 2012/0052892 | A1 | 3/2012 | Braithwaite | |
| 2012/0121249 | A1 | 5/2012 | Sabat, Jr. et al. | |
| 2012/0309328 | A1 | 12/2012 | Morrison et al. | |
| 2012/0329523 | A1 | 12/2012 | Stewart et al. | |
| 2013/0309328 | A1 | 12/2012 | Morrison et al. | |
| 2013/0195467 | A1 | 8/2013 | Schmid et al. | |
| 2014/0003561 | A1 | 1/2014 | Ranson et al. | |
| 2014/0016583 | A1 | 1/2014 | Smith | |
| 2014/0064341 | A1 | 3/2014 | Johansson et al. | |
| 2014/0169263 | A1 | 6/2014 | Stapleton | |
| 2015/0036519 | A1 | 2/2015 | Kazmi et al. | |
| 2016/0094267 | A1* | 3/2016 | Petrovic | H04B 1/525 455/78 |
| 2016/0099732 | A1 | 4/2016 | Petrovic et al. | |
| 2016/0226653 | A1* | 8/2016 | Bharadia | H04B 1/525 |

FOREIGN PATENT DOCUMENTS

| | | |
|---|---|---|
| WO | 9705705 | 2/1997 |
| WO | 2010092166 | 8/2010 |
| WO | 2012166961 | 12/2012 |

OTHER PUBLICATIONS

European Patent Office, "European Office Action for EP Application No. 15741470.7", "from U.S. Appl. No. 14/686,415", dated Nov. 4, 2016, pp. 1-4, Published in: EP.

European Patent Office, "European Extended Search Report from EP application No. 15741470.7 dated Feb. 12, 2016", "from foreign counterpart of U.S. Appl. No. 14/686,415", dated Feb. 12, 2016, pp. 1-8, Published in: EP.

United States Patent and Trademark Office, "Advisory Action", "From U.S. Appl. No. 14/686,415", dated Jan. 12, 2017, pp. 1-3, Published in: US.

United States Patent and Trademark Office, "Notice of Allowance", "From U.S. Appl. No. 14/686,415", dated Mar. 6, 2017, pp. 1-11, Published in: US.

United States Patent and Trademark Office, "Office Action", "From U.S. Appl. No. 14/686,415", dated May 18, 2016, pp. 1-20, Published in: US.

United States Patent and Trademark Office, "Final Office Action", "From U.S. Appl. No. 14/686,415", dated Oct. 14, 2016, pp. 1-12, Published in: US.

International Search Authority, "International Search Report and Written Opinion for PCT/US2015/025707", "Foreign Counterpart to U.S. Appl. No. 14/686,415", dated Jul. 14, 2015, pp. 1-10, Published in: WO.

Van Berkel et al., "Vector Processing as an Enabler for Software-Defined Radio in Handsets From 3G+WLAN Onwards", "http://datamemberclicks.com/site/sdf/sdr04-2.4-1%20Berkel.pdf", 2004, p. 6 Publisher: Proceeding of the SDR 04 Technical Conference and Product Exposition.

Graybar, "In-Building Wireless Distributed Antenna System", "InterReach Spectrum", Revision 2011, 2010, pp. 1-11, No. 109534AWE 9/11, Publisher: TE Connectivity Ltd.

Martone, "A Blind Adaptive QR-Based Lattice Multi-Channel Filter for Cellular Base-Station TDMA Transeivers with Antenna Arrays", 1997, pp. 147-151, Publisher: IEEE.

Wake et al., "Radio Over Fiber Link Design for Next Generation Wireless Systems", "Journal of Lightwave Technology", Aug. 15, 2010, pp. 2456-2464, vol. 28, No. 16, Publisher: IEEE.

Yamada et al., "RF Filter Technologies for W-CDMA Mobile Telecommunication System (Translation of Abstract only—1 page)", Dec. 2001, pp. 88-92, vol. 47, No. 6, Publisher: Matsushita Technical Journal.

European Patent Office, EP Office Action from EP Application No. 15741470.7 dated Sep. 28, 2017, from Foreign Counterpart of EP U.S. Appl. No. 14/686,415, dated Sep. 28, 2017, pp. 1-4, EP.

* cited by examiner

WIDEBAND REMOTE UNIT FOR DISTRIBUTED ANTENNA SYSTEM

CROSS-REFERENCE TO RELATED APPLICATION

This application is a continuation application of U.S. patent application Ser. No. 14/686,415, titled "WIDEBAND REMOTE UNIT FOR DISTRIBUTED ANTENNA SYSTEM" and filed on Apr. 14, 2015, which claims priority to, and the benefit of, U.S. Provisional Application Ser. No. 61/979,948, filed on Apr. 15, 2014 and titled "Wideband Remote Unit for Distributed Antenna System," the contents of which are each incorporated herein by reference.

TECHNICAL FIELD

The present disclosure relates generally to telecommunication systems and more particularly (although not necessarily exclusively) to wideband remote units for distributed antenna systems.

BACKGROUND

A distributed antenna system ("DAS") can be used to provide wireless communications coverage in a variety of environments, particularly in large structures such as office buildings, convention halls, airports, stadiums, and the like. A DAS can include one or more head-end units (e.g., master units) that are communicatively coupled to one or more base stations. A DAS can also include multiple remote units that are communicatively coupled to each head-end unit. The remote units, each of which can include one or more transceivers and antennas, can be distributed across a coverage area. The remote units can transmit the downlink signals to mobile phones or other terminal devices within coverage areas serviced by the remote units.

Remote units for a DAS may use large amounts of electrical power and may have a large physical size. For example, the power requirements and size of a remote unit may be increased if the remote unit includes extensive analog circuitry for down-converting or otherwise modifying received analog signals prior to generating a digitized representation of communication channels of interest.

The power requirements and size of a conventional remote unit may also be increased by using multiple RF transceivers in a DAS to transmit and receive signals in multiple frequency bands. For example a remote unit may include a first RF transceiver with associated analog circuitry for communicating signals in an Advanced Mobile Phone System ("AMPS") band, a second RF transceiver with associated analog circuitry for communicating signals in a Personal Communications Service ("PCS") band, and a third RF transceiver with associated analog circuitry for communicating signals in an Advanced Wireless Services ("AWS") band, etc. One or more of the power requirements and physical size of a remote unit may increase costs associated with manufacturing or installing the remote unit.

SUMMARY

The present disclosure describes devices, systems, and methods involving a wideband remote unit for a distributed antenna system ("DAS").

In some aspects, a method is provided. The method can involve a wideband remote unit receiving, via an uplink path, wideband signals that include an uplink RF signal and a leaked downlink RF signal. The uplink RF signal can have an uplink signal power at or near a noise level of the wideband remote unit. The leaked downlink RF signal can have a downlink signal power greater than the uplink signal power. The leaked downlink RF signal can be a downlink RF signal that is transmitted by the remote unit and received by an antenna of the remote unit. The method can also involve converting, by the wideband remote unit, the received wideband signals to digital RF signals that represent the uplink signal and the downlink signal. The method can also involve transmitting, by the wideband remote unit, the digital RF signals to a unit of the DAS for transmission to a base station by the unit.

In other aspects, a wideband remote unit is provided. The wideband remote unit can include one or more antennas and an analog-to-digital converter ("ADC"). An antenna of the wideband remote unit can receive wideband signals. The wideband signals can include an uplink RF signal and a leaked downlink RF signal. The uplink RF signal can have an uplink signal power at or near a noise level of the wideband remote unit. The leaked downlink RF signal can have a downlink signal power greater than the uplink signal power. The ADC can convert the received wideband signals to digital RF signals representing both the uplink signal and the downlink signal. The wideband remote unit can transmit the digital RF signals to a unit of a DAS for transmission to a base station.

In other aspects, a DAS is provided that includes one or more wideband remote units and a unit that can communicate with a base station. The wideband remote unit can receive wideband signals. The wideband signals can include an uplink RF signal and a leaked downlink RF signal. The uplink RF signal can have an uplink signal power at or near a noise level of the wideband remote unit. The leaked downlink RF signal can have a downlink signal power greater than the uplink signal power. The wideband remote unit can convert the received wideband signals to digital RF signals representing the uplink signal and the downlink signal. The unit can receive the digital RF signals from the remote unit. The unit can transmit an uplink signal corresponding to one of the digital RF signals to a base station. The unit can mitigate another digital RF signal corresponding to the leaked downlink RF signal.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
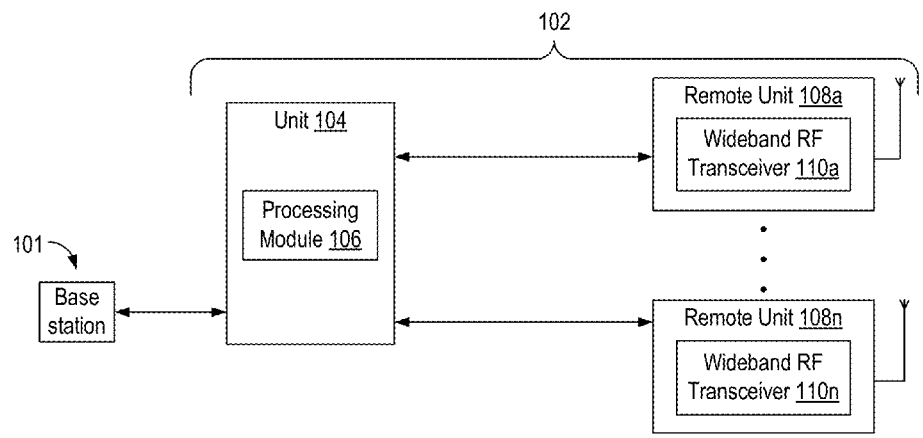
FIG. 1 is a block diagram depicting an example of a distributed antenna system ("DAS") that includes wideband remote units according to one aspect of the present disclosure.

The present disclosure relates to a wideband remote unit for a distributed antenna system ("DAS"). A wideband remote unit can include any remote unit for a DAS that is configured to generate digitized RF uplink signals from analog uplink RF signals that are received at frequencies over a wideband spectrum (e.g., 200 MHz to 3 GHz). A wideband spectrum can include a spectrum including frequency bands associated with multiple types of telecommunication providers (e.g., code division multiple access ("CDMA") systems, Long Term Evolution ("LTE") systems, etc.). The wideband remote unit can transmit the digitized RF uplink signals to a head-end unit or other suitable unit of the DAS.

In some aspects, the wideband remote unit can perform some analog and signal processing. The wideband remote unit can be limited to transmitting signals of interest, receiving signals of interest, and transporting the signals to a central unit in a DAS for processing (e.g., a head-end unit, an expansion unit, etc.). The wideband remote unit can be implemented in a manner that allows the wideband remote unit to have one or more of a smaller size or lower power requirements as compared to other remote units.

In some aspects, the wideband remote unit can be implemented without frequency translation circuitry. For example, the wideband remote unit can include a high-speed analog-to-digital converter ("ADC") that can sample signals at a sufficiently high sampling rate that allows the wideband remote unit to omit down-conversion circuitry for converting RF signals to intermediate frequency ("IF") signals.

In additional or alternative aspects, the wideband remote unit can be implemented without isolation circuitry for isolating uplink signals from downlink signals. For example, an ADC of the wideband remote unit can have a sufficiently wide dynamic range to digitally represent low-power uplink signals in the uplink path and high-power downlink signals that leak to the uplink path. Digitally representing signals over a wide dynamic range can allow a head-end unit or other suitable high-power unit in the DAS to attenuate leaked downlink signals in the uplink path. Using a head-end unit or other suitable high-power unit in the DAS rather than the remote unit to attenuate leaked downlink signals in the uplink path can limit the amount of circuitry required by the remote unit.

In some aspects, the wideband remote unit can be used without specifically designing or otherwise configuring the wideband remote unit for operation with a given telecommunication standard, frequency band, or other telecommunication technology. For example, the wideband remote unit can include a wideband receiver that can be used to receive signals in multiple frequency bands.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a DAS 102 that includes wideband remote units 108a-n according to one aspect. The DAS 102 can communicate signals between one or more base stations 101 or other transceiver devices (e.g., repeaters) and terminal devices in one or more coverage zones serviced by the DAS 102. Terminal devices can be electronic devices used to communicate one or more of voice and data via a telecommunication system, such as (but not limited to) mobile phones.

The DAS 102 can include one or more units 104. Examples of a unit 104 include a head-end unit, a base station router, or other suitable unit that can communicate with a base station. In some aspects, the unit 104 can be a head-end unit or other suitable unit that can communicate with one or more base stations 101 or other transceiver devices in communication with the DAS 102. A head-end unit can include, for example, an optical transceiver that transmits optical signals to the wideband remote units 108a-n. The head-end unit or other suitable unit 104 can communicate with remote units 108a-n in different coverage zones of the same DAS 102. In additional or alternative aspects, the unit 104 can be included in a base station router or other suitable device that can communicate signals between one or more base stations 101 and one or more head-end units. In additional or alternative aspects, the unit 104 can be included in an extension unit or other suitable unit that can communicate signals between one or more head-end units and the wideband remote units 108a-n.

The DAS 102 can also include remote units 108a-n having respective wideband RF transceivers 110a-n. Each of the wideband remote units 108a-n can include transceiver devices that can include or be communicatively coupled to one or more antennas. One example of a remote unit is a universal access point. A DAS 102 can include any number of units 104 and any number of remote units 108a-n.

The DAS 102 can communicate signals to and from terminal devices via the unit 104 and the wideband remote units 108a-n that service one or more coverage zones. The unit 104 can be communicatively coupled with the base station 101 and the wideband remote units 108a-n in any suitable manner. Communicatively coupling devices in a DAS 102 or other telecommunication system can involve establishing, maintaining, or otherwise using a communication link (e.g., a cable, an optical fiber, a wireless link, etc.) to communicate information between the devices. Any suitable types of communication links can be used in the DAS 102. A suitable communication link can be a wired connection or a wireless connection. Types of wired connections can include, for example, a connection via a copper cable, an optical fiber, or another suitable communication medium. Types of wireless connections can include, for example, a wireless RF communication link or a microwave link. The type of communication link between the base station 101 and the unit 104 can be the same as or different from the type of communication link between the unit 104 and the wideband remote units 108a-n.

The unit 104 can provide downlink signals from the base station 101 to the wideband remote units 108a-n and receive uplink signals from the wideband remote units 108a-n to be provided to the base station 101. Downlink signals can include signals provided from the base station 101 and transmitted by the wideband remote units 108a-n in coverage zones. Uplink signals can include signals transmitted by terminal devices and received by the wideband remote units 108a-n.

The wideband remote units 108a-n can provide signal coverage in one or more coverage zones. Providing signal coverage in the coverage zones can include wirelessly transmitting downlink signals received from the unit 104 to terminal devices in the coverage zones. Providing signal coverage in the coverage zones can also include wirelessly receiving uplink signals from the mobile communication devices or other terminal devices in the coverage zones. The wideband remote units 108a-n can transmit the uplink signals to the unit 104. The unit 104 can transmit the uplink signals to the base station 101.

Although FIG. 1 depicts direct links between the unit 104 and the wideband remote units 108a-n, other implementations are possible. In some aspects, the unit 104 can be communicatively coupled to the wideband remote units 108a-n via one or more extension units or other intermediate devices.

The unit 104 can combine uplink transmissions received from some or all of the wideband remote units 108a-n into a combined uplink signal, such as a composite signal. A transmitter of the unit 104 can transmit the combined uplink signal to an uplink receiver of the base station 101. The unit 104 can use the processing module 106 to combine uplink transmissions received from the wideband remote units 108a-n. The processing module 106 can include one or more devices configured to select uplink signals for a combination, programming instructions executable by a processor to select uplink signals for a combination, or any suitable combination thereof.

In some aspects, the wideband remote units 108a-n can operate using a reduced amount of RF circuitry as compared to conventional remote units. Reducing the amount of circuitry in a remote unit can reduce one or more of the size of the remote unit and the costs associated with manufacturing or installing the remote unit. The amount of circuitry used in a remote unit can be reduced by, for example, using a single RF transceiver that is configured for digitizing signals having frequencies within large frequency bandwidths for digital transport to a unit 104 or other head-end unit. The amount of circuitry used in a wideband remote unit 108 can also be reduced by, for example, omitting RF signal processing components such as up-conversion components, down-conversion components, isolation devices, etc.

Figure 2:
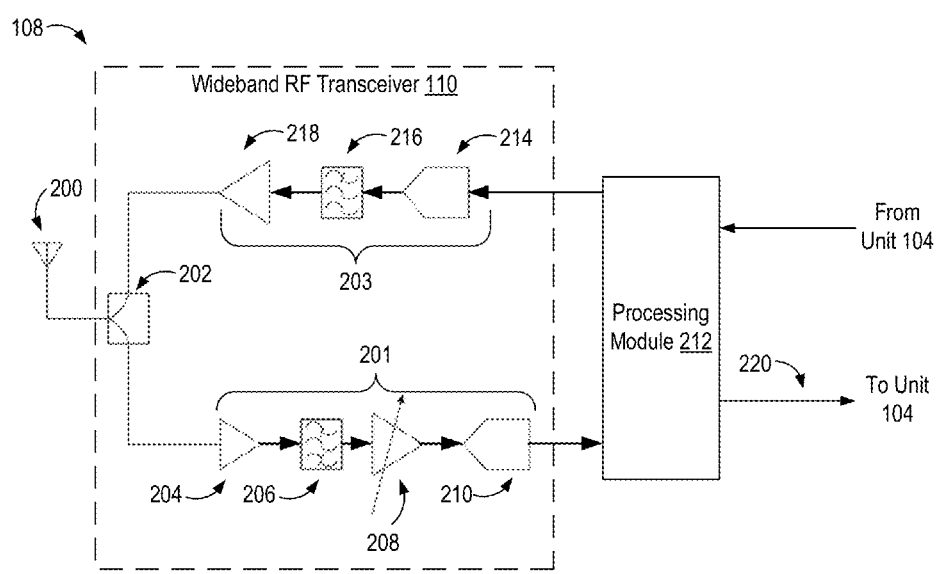
FIG. 2 is a block diagram depicting an example of a wideband remote unit of the DAS from FIG. 1 according to one aspect of the present disclosure.

FIG. 2 is a block diagram depicting an example of a wideband remote unit 108 according to one aspect. The wideband remote unit 108 can include an antenna 200, a multiple wideband RF transceivers 110, and a processing module 212.

The multiple wideband RF transceivers 110 can include an uplink path 201 and a downlink path 203. The uplink path 201 can include a low-noise amplifier 204, an anti-aliasing filter 206, a variable gain device 208, and an ADC 210. In some aspects, the uplink path 201 can be limited to the devices depicted in FIG. 2. In other aspects, the uplink path 201 can include additional devices other than those depicted in FIG. 2. The downlink path 203 can include a digital-to-analog converter ("DAC") 214, an image filter 216, and a power amplifier 218. In some aspects, the downlink path 203 can be limited to the devices depicted in FIG. 2. In other aspects, the downlink path 203 can include additional devices other than those depicted in FIG. 2.

In the uplink direction, one or more elements of the antenna 200 can receive uplink signals. Although a single antenna 200 is depicted for illustrative purposes, other implementations are possible. In some aspects, one or more antenna elements can be used for transmitting signals and one or more other antenna elements can be used for receiving signals. In other aspects, one or more antenna elements can be used for transmitting signals and receiving signals in a time-division multiplexed manner.

A splitter-combiner 202 in the multiple wideband RF transceivers 110 can communicatively couple the downlink path 203 and the uplink path 201 to a common port that is communicatively coupled to the antenna 200. The splitter-combiner 202 can split downlink signals to be transmitted via the antenna 200 from uplink signals that are received via the antenna 200. The low-noise amplifier 204 can amplify the uplink signals to improve the signal-to-noise ratio of the received uplink signals.

The anti-aliasing filter 206 can filter the received uplink signals to reduce or prevent aliasing. Aliasing can be caused by converting analog uplink signals to digital uplink signals using the ADC 210. For example, the low-noise amplifier 204 can have a high dynamic range. The high dynamic range can compensate for limited attenuation from the downlink path 203. The anti-aliasing filter 206 in the uplink path 201 can reduce or prevent undesired signals from aliasing into desired Nyquist zones. One example of an anti-aliasing filter 206 is a surface acoustic wave ("SAW") filter. In some aspects, a mixer or other demodulation device can be included in the uplink path 201. An example of a bandwidth that may be used by the anti-aliasing filter 206 is 75 MHz. For sample rates as high as 7 GHz, the anti-aliasing filter 206 can be a low-pass filter with a cut-off frequency below 3.5 GHz, which is the limit of the Nyquist zone. In another example, the anti-aliasing filter 206 can use a 3.2 GHz sample rate and can have an RF input bandwidth between 30 MHz and 450 MHz.

In another example, the anti-aliasing filter 206 can use a sample rate of up to 3 GHz and can have a 2.5 GHz input bandwidth. In this example, the frequency range from 700 MHz to 1 GHz can be sampled in the first Nyquist zone, and the frequency range from 1.7 GHz to 2.2 GHz can be sampled in the second Nyquist zone. The sample rate for the anti-aliasing filter 206 can be selected (e.g., 2.3 GHz) to avoid aliasing of the two frequency ranges onto the same frequency.

The ADC 210 can convert the analog uplink signal to a digital uplink signal. The ADC 210 can digitize uplink signals in a manner that allows for the omission of frequency translation circuitry (e.g., down-conversion circuitry such as a mixer and local oscillator) from the uplink path 201. In some aspects, the ADC 210 can use a sampling rate suitable for sampling signals from a wideband spectrum. The ADC 210 may be configured to sample analog uplink RF signals at a sufficiently high sampling rate such that high-frequency signals in a wideband spectrum are sampled at a rate greater than or equal to a Nyquist rate (e.g., twice the frequency of the sampled analog signal). For example, a wideband spectrum may include signals having frequencies up to 3.5 GHz, and the ADC 210 may use a sampling rate of 7 GHz or higher.

A wideband spectrum can include a spectrum having frequency bands associated with multiple types of telecommunication providers. In some aspects, the wideband behavior of the remote unit 108 can involve the remote unit 108 being non-selective such that all RF bands within the frequency range of the remote unit 108 are processed. For example, the remote unit 108 can be implemented without using dedicated filters to isolate one or more bands. The wideband behavior of the remote unit 108 can also involve the remote unit 108 processing both downlink and uplink frequencies rather than using one or more filters to select a downlink frequency band or uplink frequency band for processing.

Additionally or alternatively, the ADC 210 can digitize uplink signals in a manner that allows for implementing the remote unit 108 without analog circuitry for isolating uplink signals from downlink signals. In some aspects, the ADC 210 can have a resolution that is suitable for digitizing signals within a wideband spectrum that have a wide range of signal powers. For example, the wideband remote unit 108 may be implemented without a duplexer or other analog devices that isolate downlink signals transmitted to terminal devices by one or more elements of the antenna 200 from uplink signals received from terminal devices by one or more elements of the antenna 200. The absence of a duplexer or other analog isolation devices can allow the downlink signals transmitted by one or more elements of the antenna 200 to be received by one or more elements of the antenna 200 and provided to the uplink path 201 of the wideband remote unit 108. These downlink signals received by the antenna 200 may have a higher signal strength than uplink signals received from terminal devices. Using an ADC 210 with a sufficient resolution can allow one or more digital processing devices in one or more of the wideband remote unit 108 and the unit 104 to distinguish between low-power uplink signals and high-power uplink signals that both traverse the uplink path 201.

The resolution of the ADC 210 can be expressed in a number of bits that correspond to a number of available signal power levels that can be digitally represented. For example, an n-bit ADC 210 can be used to digitally represent $2^n$ signal power levels. The dynamic range of the ADC 210 (e.g., the range of signal power levels that can be digitally represented using the ADC 210) can correspond to number n of bits for the ADC 210 and the increment between the digitally represented power levels. For example, for an increment of m dB per bit, the dynamic range of an n-bit ADC 210 is n×m dB. A sufficiently wide dynamic range of the ADC 210 can allow the anti-aliasing filter 206 to digitize both uplink signals having low signal powers and downlink signals that may leak into the uplink path 201. One example of the ADC 210 is a delta-sigma ADC.

In some aspects, the dynamic range for the ADC can be 6.02 dB×n+1.76 dB. In other aspects involving higher bit numbers, the signal dynamic range improvement may decrease (e.g., to a factor of 3 dB increasing from n=12 to n=14).

The sampling rate of the ADC 210, the number of bits used by the ADC 210 to express signal power levels, and a data rate of a communication link 220 from the wideband remote unit 108 to the unit 104 can be related. The product of the sampling rate of the ADC 210 and the number of bits used by the ADC 210 can be less than or equal to a data rate of a serial communication link 220 used to communicate digital uplink signals to the unit 104. For example, the ADC 210 may sample values from an analog uplink signal at a rate of r samples per second. The ADC can encode each sampled value using n bits. Communicating n-bit samples at a rate of r samples per second can involve using a communication link 220 having a data rate of r×n bits per second.

The following non-limiting example illustrates (without limitation) a sample configuration for the wideband remote unit 108. With respect to the sampling frequency of the wideband remote unit 108, the wideband remote unit 108 may be used to receive uplink signals in frequency bands from 200 MHz to 3 GHz. The anti-aliasing filter 206 can have a low pass corner frequency of 3 GHz with a stop-band frequency of 4 GHz. The ADC 210 can be configured to digitally represent the bandwidth of 3.5 GHz that accounts for the uplink frequency bands and the stop-band frequency by using a sampling rate of at least 7 GHz (e.g., double the highest frequency of 3.5 GHz). With respect to the dynamic range of the wideband remote unit 108, the signal powers of uplink signals received by the wideband remote unit 108 may be as low as −105 dBm. The signal powers of downlink signals transmitted by the wideband remote unit 108 may be as high as +12 dBm. If the downlink path 203 and the uplink path 201 are not isolated from one another, the range of signal powers for signals traversing the uplink path 201 (e.g., low-power uplink signals, downlink signals received by one or more elements of the antenna 200) can be from −105 dBm to +12 dBm, for a total range of 117 dB. If an increment of 6 dB is used to represent different signal power levels, the ADC 210 can use 20 bits (117 dB divided by 6 dB per bit) to digitally represent sampled signal power values of analog uplink RF signals. In some cases, the data rate for a serial communication link 220 between the wideband remote unit 108 and the unit 104 can be at least 140 Gbps (the product of the 7-GHz sampling rate and the 20-bit digital value) in the uplink direction. In other cases, the data rate for the serial communication link 220 can be reduced further using filtering and sample rate conversion.

In the downlink direction, the wideband remote unit 108 can receive digital downlink signals from the unit 104. For example, a digital signal representing a downlink frequency band can be provided to a DAC 214 of the wideband remote unit 108 via a serial communication link from a unit 104.

The digital downlink signals can be converted to analog RF downlink signals by the high-speed DAC 214. The DAC 214 can generate RF signals without performing frequency translation in the analog domain using frequency translation circuitry (e.g. up-conversion circuitry such as a mixer and local oscillator in the downlink path 203). In some aspects, frequency translation may be performed in the digital domain using high-speed digital circuitry in the DAC 214. In additional or alternative aspects, frequency translation may be performed in the digital domain using a processing module 212.

The image filter 216 can filter the RF downlink signals to remove images generated by the DAC 214. The DAC 214 may create images as a result of the sample-and-hold operation performed by the DAC 214. The image filter 216 that removes or reduces these images can be an image rejection analog filter in the downlink path 203.

The RF downlink signals can be amplified by the power amplifier 218 for transmission to one or more terminal devices.

In some aspects, the wideband remote unit 108 can include a single wideband RF transceiver 110 that is configured to receive and transmit signals at frequencies within all frequency bands of interest for a DAS 102. In other aspects, a wideband remote unit 108 can include multiple wideband RF transceivers 110. Each of the wideband RF transceivers 110 can receive and transmit signals at frequencies within a portion of the frequency bands of interest for a DAS 102. For example, a first wideband RF transceiver in the wideband remote unit 108 can transmit or receive signals having frequencies in a frequency band of 200 MHz to 1 GHz, a second wideband RF transceiver in the wideband remote unit 108 can transmit or receive signals having frequencies in a frequency band of 1 GHz to 2 GHz, and a third wideband RF transceiver in the wideband remote unit 108 can transmit or receive signals having frequencies in a frequency band of 2 GHz to 3 GHz.

The wideband remote unit 108 can include simplified circuitry as compared to an RF transceiver of a conventional remote unit. In some aspects, the wideband remote unit 108 can omit circuitry used for frequency translation that would otherwise be performed in one or both of the uplink path 201 and the downlink path 203 (e.g., up-conversion components, down-conversion components, amplifiers used to compensate for loss introduced by frequency translation, etc.). For example, conventional remote units of a DAS may include a large amount of RF, analog, and digital circuitry, such as a downlink path 203 and an uplink path 201 having multiple RF processing components. The downlink path 203 can include up-conversion circuitry (e.g., a local oscillator and a mixer) to up-convert downlink signals from IF to RF and a filter and amplifier following the up-conversion circuitry. The uplink path 201 can include a bandpass filter, down-conversion circuitry (e.g., a local oscillator and a mixer) to down-convert uplink signals from RF to IF, and one or more amplifiers following the down-conversion circuitry.

The RF, analog, and digital circuitry of a conventional remote unit may use a large amount of power. For example, the mixers in the uplink and downlink paths 203 can respectively attenuate uplink and downlink signals. The amplifiers following the mixers in the uplink and downlink paths 203 can compensate for the loss introduced by the mixers. Other RF signal processing components, such as anti-aliasing filters, can be used to compensate for non-linear distortion of uplink and downlink signals introduced by the up-conversion and down-conversion circuitry. The use of the amplifiers and filters associated with up-conversion components and down-conversion components can increase one or more of the power used by a remote unit, the size of the remote unit, the costs associated with manufacturing or installing the remote unit, etc. The inclusion of the RF, analog, and digital circuitry may also increase the physical dimensions of the remote unit, thereby increasing the amount of space required to install the remote unit in a deployment environment (e.g., a building serviced using the DAS 102).

In some aspects, the wideband remote unit 108 can be implemented without a duplexer. For example, a conventional RF transceiver may include one or more duplexers for isolating a transmitter output (e.g., downlink signals) from a receiver input (e.g., uplink signals). The duplexer can allow frequencies within the downlink frequency band to be provided from the transmitter output to the antenna and can allow frequencies within the uplink frequency band to be provided from the antenna output to the receiver. Isolating a transmitter output from a receiver input can prevent downlink signals from interfering with uplink signals. The duplexer may introduce some amount of insertion loss, which can cause some of the power amplification from the power amplifier to be wasted. The waste of power amplification can reduce the efficiency of conventional remote units.

Figure 3:
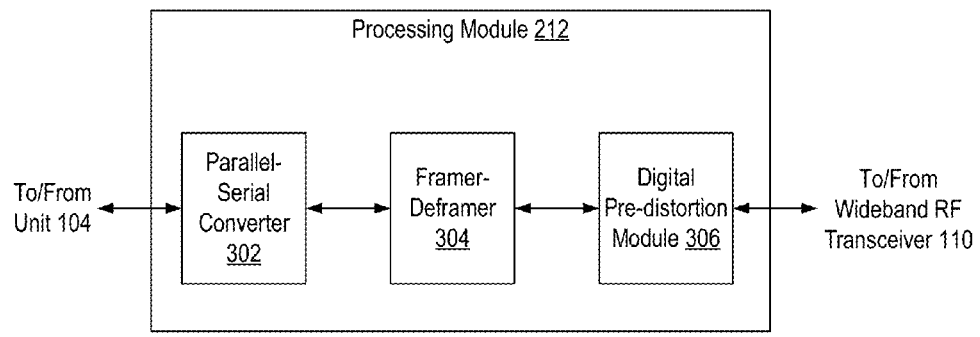
FIG. 3 is a block diagram depicting an example of a processing module of a remote unit from FIG. 2 according to one aspect of the present disclosure.

FIG. 3 is a block diagram depicting an example of the processing module 212 of the wideband remote unit 108 according to one aspect. The processing module 212 can include one or more suitable processing devices that can be used to implement a digital processing section. The processing module 212 can perform one or more operations on downlink signals received from a unit 104. The processing module 212 can also perform one or more operations on uplink signals to be provided to the unit 104. Examples of a processing device include an application-specific integrated circuit ("ASIC"), a field-programmable gate array ("FPGA"), or another suitable processing device or suitable processing circuitry.

The processing module 212 can include a parallel-serial converter 302, a framer-deframer 304, and a digital pre-distortion module 306. In some aspects, one or more of the parallel-serial converter 302, the framer-deframer 304, and the digital pre-distortion module 306 can include one or more hardware devices included in or communicatively coupled to a processing device of the processing module 212. In additional or alternative aspects, one or more of the parallel-serial converter 302, the framer-deframer 304, and the digital pre-distortion module 306 can include program code stored in a memory device and executed by a processing device of the processing module 212. In additional or alternative aspects, one or more of the parallel-serial converter 302, the framer-deframer 304, and the digital pre-distortion module 306 can be implemented using a combination of one or more hardware devices included in or communicatively coupled to a processing device of the processing module 212 and program code stored in a memory device and executed by a processing device of the processing module 212.

In a downlink direction, the parallel-serial converter 302 can perform one or more operations to de-serialize a serial downlink data stream into multiple digital downlink signals to be provided to different downlink paths 203 of the wideband remote unit 108. For example, the parallel-serial converter 302 can de-multiplex digital downlink signals from a common serial downlink data stream. In an uplink direction, the parallel-serial converter 302 can perform one or more operations to serialize parallel uplink signals into a common serialized uplink data stream to be provided to the unit 104. For example, the parallel-serial converter 302 can combine parallel uplink digital signals received from multiple uplink signal paths of the remote 108 into a serialized uplink signals.

In additional or alternative aspects, the transport between the unit 104 and one or more of the ADC 210 and the DAC 214 can use an internal format for the ADC 210 and the DAC 214, which can be transported either as-is or with framing by the framer-deframer 304. In these aspects, the parallel-serial converter 302 can be omitted.

In additional or alternative aspects, a regenerating serial data link repeater can be included to restore the bits to meet the timing that is used by the DAC 214 or the unit 104. In a downlink direction, the framer-deframer 304 can de-frame digital downlink signals to obtain downlink payload data for transmission via the antenna 200. In an uplink direction, the framer-deframer 304 can frame digital uplink signals for transmission to the unit 104.

In some aspects, the digital pre-distortion module 306 can pre-distort downlink signals prior to digital-to-analog conversion and transmission via the antenna 200. Pre-distorting downlink signals prior to transmission via the antenna 200 can reduce or prevent downlink intermodulation products from being generated in the downlink path 203. For example, one or more components of the downlink path 203 or elsewhere in the remote unit 108 can include non-linearities that generate intermodulation products. The digital pre-distortion module 306 can pre-distort downlink signals in a manner that offsets or otherwise compensates for these non-linearities. Offsetting or otherwise compensating for these non-linearities can prevent intermodulation products from being transmitted by the remote unit 108 or reduce the intermodulation products received in the uplink path 201. In additional or alternative aspects, the digital pre-distortion module 306 can pre-distort digital uplink signals prior to transmission to the unit 104. Pre-distorting uplink signals prior to transmission via the antenna 200 can reduce or prevent uplink intermodulation products from being generated in an uplink path to the unit 104. In some aspects, this predistortion can address the intermodulation products generated from one or more of intra-band signal combinations and interband combinations.

In other aspects, the wideband remote unit 108 may be implemented with highly linear stages, such that the digital pre-distortion module 306 may be omitted.

The processing module 212 can be used to prepare digital signals for transport via the DAS 102. In the uplink path 201, the processing module 212 can extract frequency channels of interest and can suppress or remove unwanted signals in the uplink path 201. In the downlink path 203, the digital processing circuit can shift frequency channels or bands of interest to a desired digital frequency prior to downlink signals being provided to the DAC 214.

Figure 4:
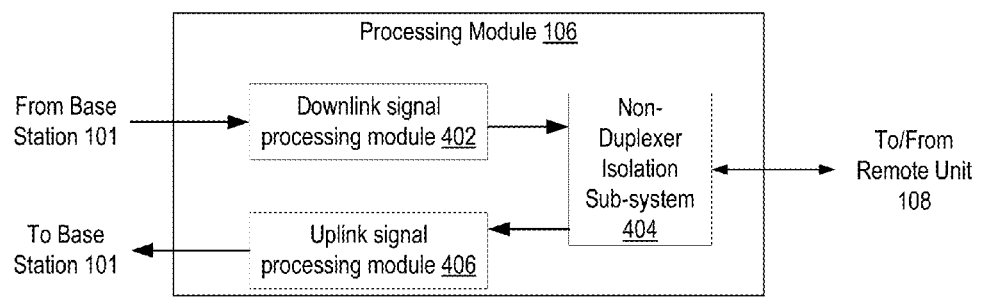
FIG. 4 is a block diagram depicting an example of a unit of the DAS from FIG. 1 according to one aspect of the present disclosure.

In some aspects, the processing module 212 depicted in FIG. 3 can be omitted from the wideband remote unit 108 and the unit 104 can include a processing module for performing the digital signal processing described above. For example, FIG. 4 is a block diagram depicting an example of a unit 104. The unit 104 can include a downlink signal processing section 402, a non-duplexer isolation sub-system 404, and an uplink signal processing section 406. The downlink signal processing section 402 can perform one or more operations for removing unwanted signals and noise from downlink signals. The uplink signal processing section 406 can perform one or more operations for removing unwanted signals and noise from uplink signals.

Using the unit 104 to remove unwanted signals and noise can allow for a reduction in one or more of the size, power requirements, and costs of manufacturing or installing wideband remote units 108a-n. The wideband remote units 108a-n can perform functions such as transmitting downlink signals, receiving the uplink signals, and communicating uplink and downlink signals with other units in the DAS 102 without performing operations for removing unwanted signals and noise.

In some aspects, the bandwidth of communication links between wideband remote units 108a-n and a unit 104 can be sufficient to accommodate signals within a large dynamic range. One example of such a bandwidth is 140 Gbps. For example, a DAS 102 using frequency division duplexing ("FDD") or time division duplexing ("TDD"), digital filtering can be used to filter downlink signals from the uplink path 201, thereby reducing the amount of transport bandwidth that is used in the uplink path 201. Adaptive filtering techniques can also be used to cancel downlink signals from the uplink path 201 to reduce the uplink transport bandwidth over the uplink serial link.

The non-duplexer isolation sub-system 404 can mitigate, cancel, filter, or otherwise attenuate downlink signals or other interfering signals traversing an uplink path 201 from the wideband remote unit. Examples of other interfering signals include intermodulation products generated by downlink signals traversing the downlink path 203 that may fall into the uplink frequency band. The non-duplexer isolation sub-system 404 can allow duplexers to be omitted from the remote units 108a-n. Any suitable implementation can be used for the non-duplexer isolation sub-system 404, such as, for example, one or more configurable filters, one or more signal cancellation sub-systems, etc.

Figure 5:
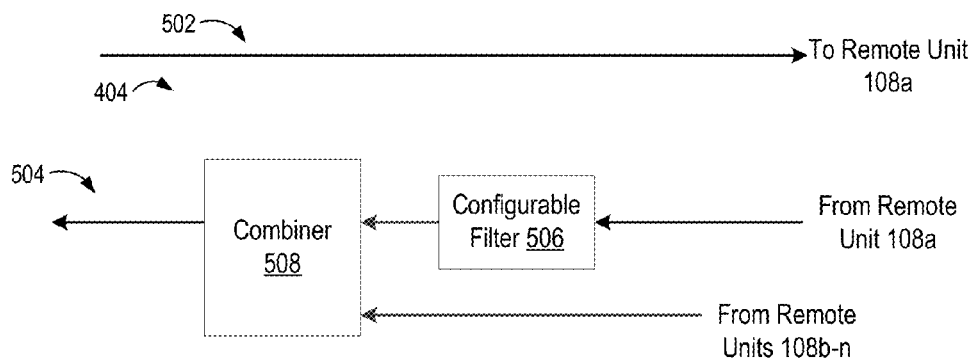
FIG. 5 is a block diagram depicting an example of a non-duplexer isolation sub-system of the unit from FIG. 4 that includes a configurable filter according to one aspect of the present disclosure.

In some aspects, the non-duplexer isolation sub-system 404 may include one or more configurable filters. For example, FIG. 5 is a block diagram depicting an example of a non-duplexer isolation sub-system 404 that includes one or more configurable filters 506 according to one aspect. The configurable filter 506 may be positioned in the uplink path 504 of the unit 104. The configurable filter 506 can reject or otherwise attenuate spurious downlink signals or other interfering signals from the downlink path 502 that may leak into, or otherwise be present in, the uplink path 504. The spurious downlink signals or other interfering signals can be attenuated with respect to a combined uplink signal generated by a combiner 508 of the unit 104. The combiner 508 can be implemented in hardware, in program code executed by a suitable processing device (e.g., an FPGA, an ASIC, etc.), or some combination thereof. The combiner 508 can combine uplink signals from multiple wideband remote units 108a-n. For example, the unit 104 can combine uplink signals received from terminal devices via the remote units 108a-n and filter or otherwise attenuate spurious downlink signals or other interfering signals. The unit 104 can transmit the combined uplink signal to the base station 101.

In additional or alternative aspects, spurious signals generated from the DAC 214 can be prevented from leaking into the uplink band (or reduced in the uplink band) by adjusting the sampling clock frequency of the DAC 214. For example, the sampling clock frequency of the DAC 214 can be adjusted to a frequency that causes the ADC 210 to move spurious downlink signals in the uplink path 201 outside of the relevant frequency band relevant for uplink traffic. The adjustment can be performed for one or more of the remote units 108a-n. The adjustment can be performed based on the uplink frequencies in use and the spurious products generated by the downlink path 203. A re-sampling block in the processing module 212 can be used to adjust the clock rates of in one or more of the remote units 108a-n if a common sampling rate is used.

In additional or alternative aspects, the phasing of the sampling clock of the ADC 210 can be modified with respect to the clock of the DAC 214. The adjustment in phase can minimize the probability of peaks at the moment of sampling. This phasing can avoid or reduce periodic signal peaking by adjusting the sample clock phase to be minimize the occurrence of peaks when sampling.

Although FIG. 5 depicts the combiner 508 as following the configurable filter 506 in the uplink path 504, other implementations are possible. For example, spurious downlink signals or other interfering signals from the wideband remote unit 108a can be combined with transmissions from other wideband remote units 108b-n, and the configurable filter 506 can be used to filter the combined uplink signal to remove or otherwise attenuate spurious downlink signals or other interfering signals.

In some aspects, the configurable filter 506 can be configured via one or more mechanical steps that select a frequency response for the configurable filter 506. In other aspects, the configurable filter 506 can be configured electronically by a control signal that configures a processor to select a frequency response for a configurable filter 506 implemented digitally. In other aspects, the configurable filter 506 can be configured electronically by an applied voltage or current signal that can modify a frequency response for a configurable filter 506 implemented using varactor diodes.

Figure 6:
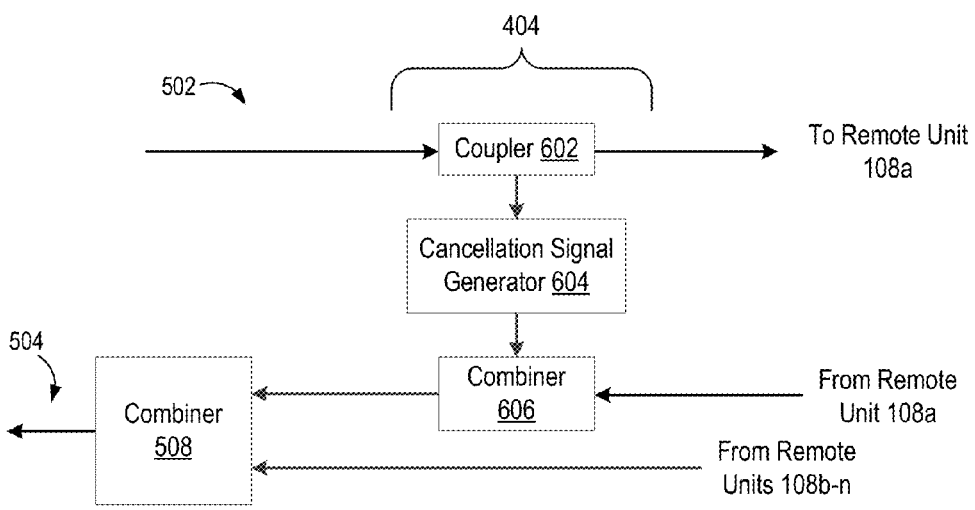
FIG. 6 is a block diagram depicting another example of a non-duplexer isolation sub-system of the unit from FIG. 4 that includes a cancellation sub-system according to one aspect of the present disclosure.

In additional or alternative aspects, the non-duplexer isolation sub-system 404 can include circuitry capable of performing active mitigation of undesirable signals. Mitigating an undesirable signal can include cancelling the undesirable signal or otherwise minimizing the undesirable signal. For example, FIG. 6 is a block diagram depicting an example of a non-duplexer isolation sub-system 404 that includes a cancellation sub-system according to one aspect. The cancellation sub-system can include a coupler 602, a cancellation signal generator 604, and a combiner 606. The cancellation sub-system depicted in FIG. 6 can be used in combination with or as an alternative to the configurable filter 506 depicted in FIG. 5.

The coupler 602 can sample a downlink signal traversing the downlink path 502. The cancellation signal generator 604 can adjust the gain and shift the phase of the sampled downlink signal to generate a cancellation signal or other mitigation signal. The cancellation signal or other mitigation signal can be summed or otherwise combined with the signal traversing the uplink path 504 using a combiner 606. Combining the cancellation signal or other mitigation signal with the signal traversing the uplink path 504 can mitigate undesirable signal components (e.g., spurious downlink signals or other interfering signals) in the signal traversing the uplink path 504.

In some aspects, the cancellation signal generator 604 can include analog filters that generate the cancellation signal or other mitigation signal. In additional or alternative aspects, the cancellation signal generator 604 can include analog filters that generate the cancellation signal or other mitigation signal. In some aspects, the analog or digital filters are adaptive filters that can adjust a frequency response dynamically. In other aspects, the analog or digital filters are non-adaptive filters that are configured to have a static frequency response that may be configured manually.

Although FIG. 6 depicts the combiner 508 as following the combiner 606 in the uplink path 504, other implementations are possible. For example, spurious downlink signals or other interfering signals from the wideband remote unit 108a can be combined with transmissions from other wideband remote units 108b-n, and a cancellation signal or other mitigation signals can be summed or otherwise combined with the combined uplink signal to remove or otherwise attenuate spurious downlink signals or other interfering signals in the combined uplink signal.

Figure 7:
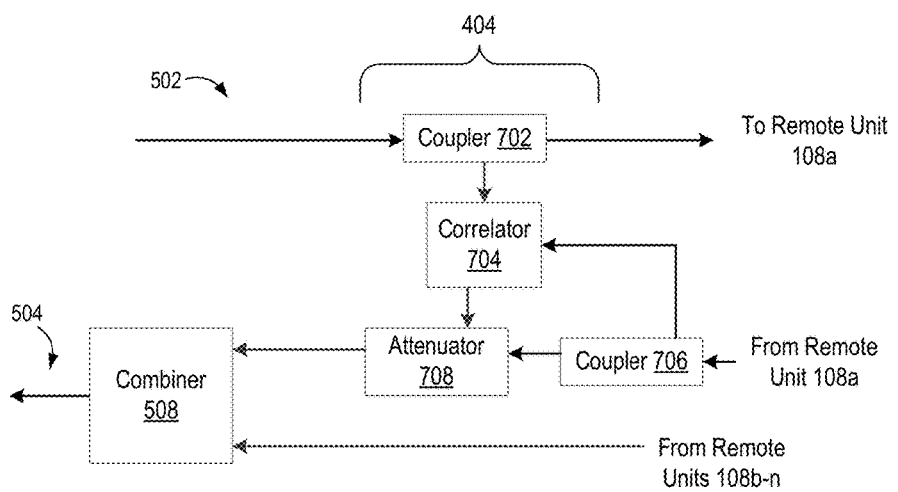
FIG. 7 is a block diagram depicting another example of a non-duplexer isolation sub-system of the unit from FIG. 4 that includes an attenuation sub-system according to one aspect of the present disclosure.

FIG. 7 is a block diagram depicting another example of a non-duplexer isolation sub-system 404 that includes an attenuation sub-system. The attenuation sub-system can include a coupler 702 that is communicatively coupled to the downlink path 502, a correlator 706, a coupler 706 that is communicatively coupled to the uplink path 504, and an attenuator 708. In various aspects, one or more of the couplers 702, 706, the correlator 706, and the attenuator 708 can be implemented as hardware devices, as program code executed by a processing device of the unit 104, or some combination thereof.

The coupler 702 can sample signals traversing the downlink path 502. The coupler 706 can sample signals traversing the uplink path 504. The correlator 704 can determine whether a signal traversing the downlink path 502 is correlated with a signal traversing the uplink path 504. A correlation between the signal traversing the downlink path 502 and the signal traversing the uplink path 504 can indicate that the signal traversing the uplink path 504 is a leaked downlink signal. The correlator 704 can respond to identifying the correlation by configuring the attenuator 708 to attenuate, mute, or otherwise exclude the signal traversing the uplink path 504 from a combined signal generated by the combiner 508.

Although FIG. 6 depicts the combiner 508 as following the attenuator 708 in the uplink path 504, other implementations are possible. The attenuation sub-system depicted in FIG. 7 can be used in combination with or as an alternative to one or more of the configurable filter 506 depicted in FIG. 5 and the cancellation sub-system depicted in FIG. 6. For example, a correlator 704 can be used to trigger or otherwise control the operation of the cancellation signal generator 604. The correlator 704 can correlate a downlink signal traversing the downlink path 502 with a signal component of a signal traversing the uplink path 504. A processing device can configure the cancellation signal generator 604 to generate a cancellation signal based on correlating the downlink signal traversing the downlink path 502 with the signal component of a signal traversing the uplink path 504. The combiner 606 can combine the cancellation signal with a combined uplink signal traversing the uplink path 504. In some aspects, a detected correlation can cause the cancellation signal generator 604 to be activated such that subsequent interfering downlink components can be cancelled from signal traversing the uplink path 504. For example, at a first point in time, a detected correlation between a first downlink signal in the downlink path 502 and a first signal component in the uplink path 504 can be subsequently used to generate a cancellation signal for cancelling, at a second point in time, a second signal component in the uplink path 504 corresponding to a second downlink signal in the downlink path 504.

In additional or alternative aspects, the non-duplexer isolation sub-system 404 or another suitable sub-system can cancel or otherwise attenuate intermodulation products generated by the remote unit 108. Such a sub-system can be implemented in a manner similar to the examples depicted in FIGS. 5 and 6. For example, in some aspects, a coupler can be positioned at the output of a power amplifier in the remote unit 108. A signal sampled using the coupler can include intermodulation products generated by the remote unit 108. The sampled signal can be used by a cancellation signal generator to generate a cancellation or other mitigation signal for suppressing the intermodulation products in the uplink path. In additional or alternative aspects, a non-linear model for the transmit chain (e.g., a DAC and power amplifier in the downlink path) can be used by a processing device to estimate or otherwise model intermodulation products generated by the remote unit 108. The non-linear model can be used to identify and suppress intermodulation products in the uplink path (e.g., through cancellation or attenuation of the intermodulation products).

Figure 8:
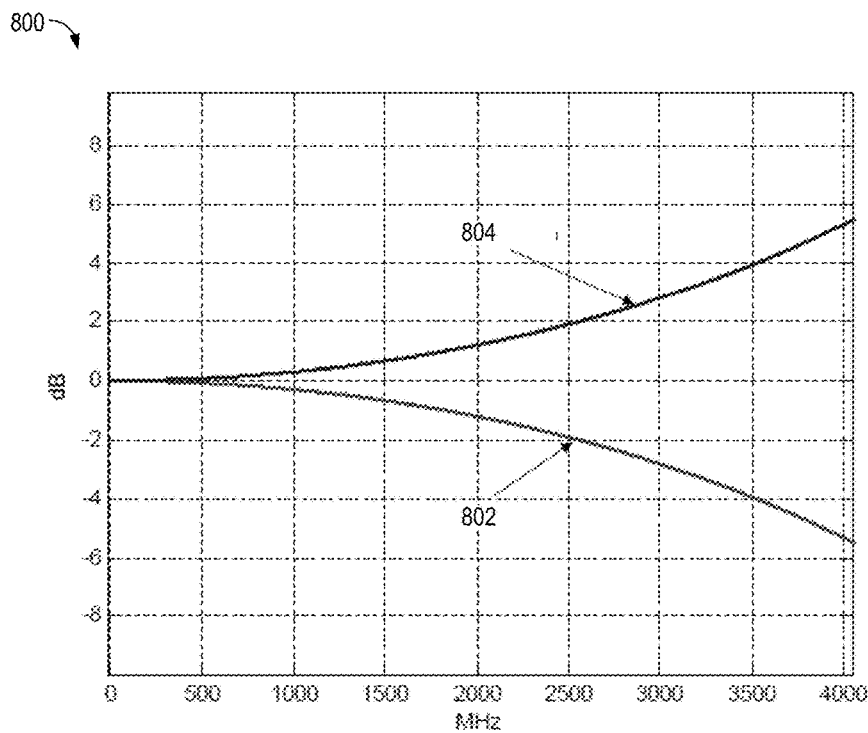
FIG. 8 is a graph depicting an example of frequency response associated with a wideband remote unit from FIGS. 1 and 2 according to one aspect of the present disclosure.

In some aspects, the DAC 214 of the wideband remote unit 108 may have a sin(x)/x response. For example, FIG. 8 is a graph 800 depicting an example of frequency response 802 associated with a wideband remote unit 108. The wideband remote 108 can use a compensation digital filter to amplify high frequency content that can be attenuated by the sin(x)/x response. The digital filtering can be performed by the DAC 214, by a processing device in the processing module 212, by an analog filter following the DAC 214 in the downlink path 203, or by any other suitable component. The example of a sin(x)/x response 802 depicted in FIG. 8 is associated with a 214 DAC that uses a sampling rate of 7 gigasamples per second. FIG. 8 also depicts a compensation 804 for the loss in gain from the sin(x)/x response that can be provided by a compensation filter.

In some aspects, a DAS 102 having wideband remote units 108a-n can support Multiple-Input Multiple-Output ("MIMO") communication. The wideband remote units 108a-n can be deployed on a smaller grid than conventional remote units. For example, a conventional remote unit may service a grid of 100 feet (or approximately 30 meters) covering 10,000 square feet (or approximately 900 square meters). A wideband remote unit 108 may service a grid of 30 feet (or approximately 10 meters) covering 900 square feet (or approximately 100 square meters). These numbers are provided for illustrative purposes only; other distance and coverage areas may be applicable. Reducing a grid size can reduce a required amount of transmit power in the downlink direction. The spacing of wideband remote units 108a-n for MIMO operation can be selected based on a required grid size required for the DAS 102.

Figure 9:
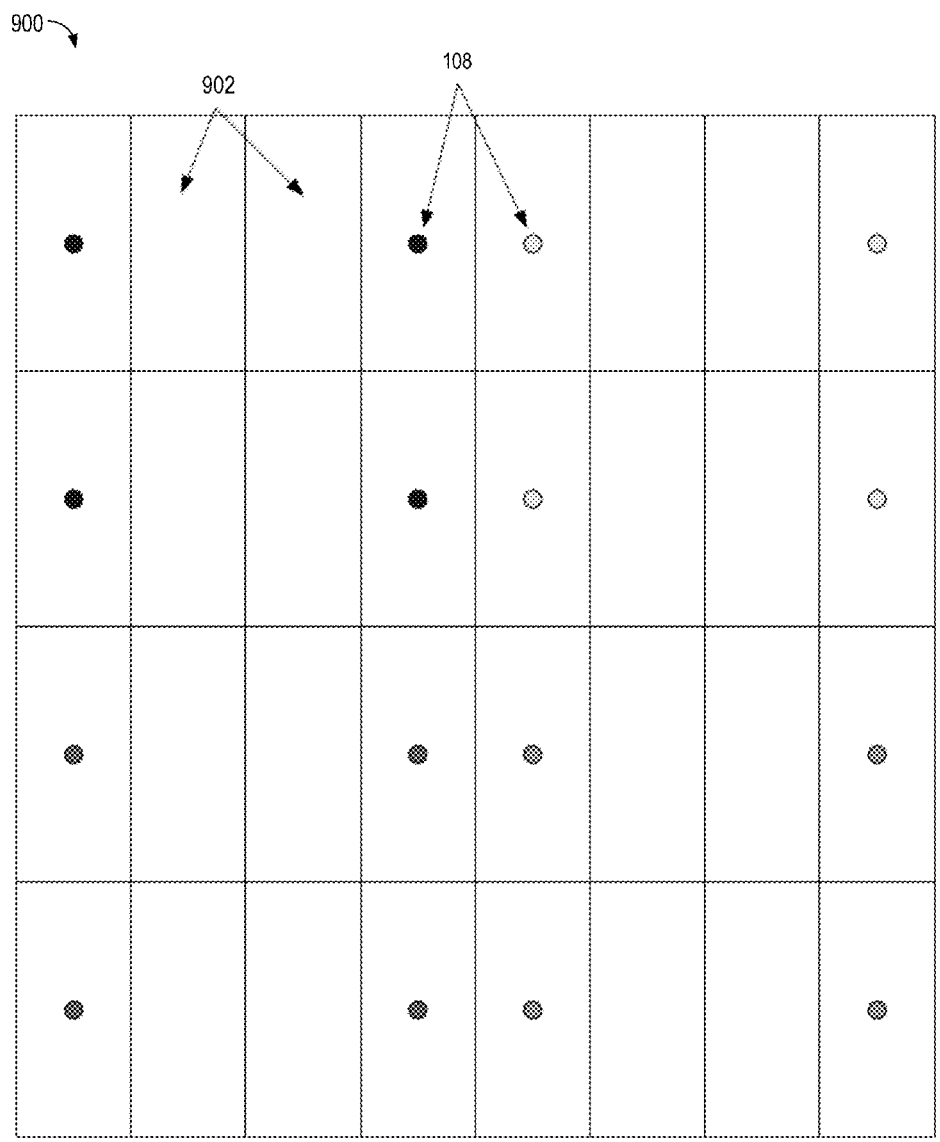
FIG. 9 is a diagram depicting an example of wideband remote units deployed in a configuration that can be used for multiple-input/multiple-output operation according to one aspect of the present disclosure.

FIG. 9 is a diagram depicting an example of wideband remote units deployed in a configuration 900 that can be used for MIMO operation according to one aspect. For example, the wideband remote units 108 can be built into or otherwise coupled to ceiling tiles 902. Other examples of structures into which the wideband remote units 108 can be built or to which the wideband remote units 108 can be coupled include light fixtures, power outlets, smoke or fire detectors, etc. The wideband remote units 108 can be used for MIMO operation. The wideband remote units 108 can be spaced apart from one another such that adjacent wideband remote units 108 can be used in a MIMO configuration. For example, as depicted in FIG. 9, the sixteen wideband remote units 108a-n are grouped into four sets of four wideband remote units 108a-n to provide a four-by-four MIMO configuration. The MIMO streams can be generated at the unit 104. The unit 104 can synchronize the MIMO streams in time such that a set or subset of the remote units 108a-n configured for MIMO operation can transmit MIMO streams simultaneously or near-simultaneously.

The DAS 102 can be configured to determine the proximity of a given wideband remote unit 108 to other wideband remote units 108. Triangulation or some intelligent method of determining relative spacing between wideband remote units 108 can be used to identify which wideband remote units 108 are to be used in a MIMO configuration. The power levels of the identified wideband remote units 108 can be adjusted to compensate for path loss.

In some aspects, the wideband remote units 108 can adaptively change from MIMO operation to single-input/single-output ("SISO") operation in cases where low multipath is experienced in the particular installation.

In additional or alternative aspects, the use of wideband remote units 108 in a DAS 102 can facilitate public safety features. For example, using a wideband remote unit 108 that services a smaller grid (e.g., 10 square feet) can allow for more precise geolocation of a terminal device (e.g., a mobile phone) than a conventional remote unit that services a larger grid (e.g., 100 square feet) employing proximity detection as an example. In some aspects, a unit 104 that receives uplink signals can identify a given uplink signal as being received at a given wideband remote unit 108 (or group of wideband remote units 108) prior to combining the uplink signal with other uplink signals. In other aspects, a processing device in a wideband remote unit 108 may implement a measurement receiver function that is used to determine the signal strength of uplink signals received from a given terminal device. The wideband remote unit 108 can notify other units in the DAS 102 that the terminal device is located in close proximity to the wideband remote based on the signal strength of the uplink signal exceeding a specified threshold.

Figure 10:
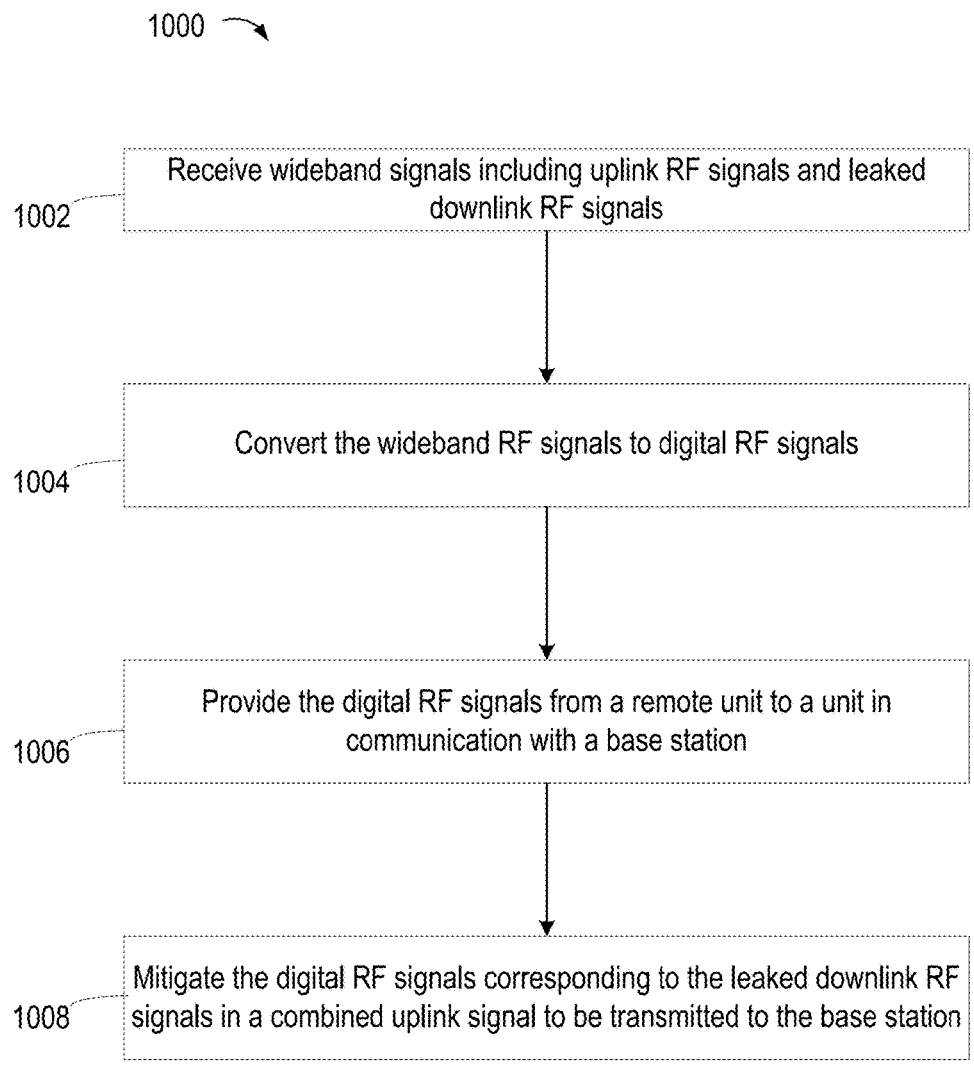
FIG. 10 is a flow chart depicting an example of a process for using a wideband remote unit from FIGS. 1 and 2 to obtain wideband uplink data according to one aspect of the present disclosure.

FIG. 10 is a flow chart depicting an example of a process 1000 for using a wideband remote unit from FIG. 1 to obtain wideband uplink data for transmission to a base station according to one aspect. The process 1000 is described with respect to one or more of the aspects and examples described above with respect to FIGS. 1-9. Other implementations, however, are possible.

The process 1000 involves receiving wideband signals including uplink RF signals and leaked downlink RF signals, as depicted in block 1002. For example, one or more of the wideband remote units 108a-n can receive wideband signals, as described above with respect to one or more of the examples in FIGS. 1-3. A wideband remote unit 108 can receive the wideband signals via an uplink path 201 that is communicatively coupled to one or more antennas 200. Uplink RF signals can include signals received by the wideband remote unit 108 from terminal devices. In some aspects, uplink RF signals can have uplink signal powers at or near a noise level (e.g. the thermal noise level) associated with the wideband remote unit (e.g., noise generated by the antenna 200). Leaked downlink RF signals can include signal power from one or more downlink RF signals traversing a downlink path 203 of the wideband remote unit 108 and transmitted using one or more elements of the antenna 200 of the wideband remote unit 108.

The process 1000 also involves converting the wideband RF signals to digital RF signals, as depicted in block 1004. For example, one or more of the wideband remote units 108a-n can convert received wideband RF signals into digital RF signals to be provided to a unit 104, as described above with respect to one or more of the examples in FIGS. 2 and 3.

In some aspects, a wideband remote unit 108 can include an ADC 210 having a dynamic range suitable for digitizing uplink signals with low signal powers and leaked downlink signals with high signal powers, as described above with respect to FIG. 2. For example, a dynamic range of the ADC 210 can have a minimum value corresponding to the noise level and a maximum value corresponding to the downlink signal power of downlink signals transmitted by the wideband remote unit 108. In some aspects, the dynamic range of the ADC 210 can be based on or otherwise correspond to a data rate of the communication link 220, as described above with respect to FIG. 2.

In additional or alternative aspects, the ADC 210 can be configured with a sampling rate that corresponds to a maximum RF frequency of the wideband signals. For example, as described above with respect to FIG. 2, the sampling rate of the ADC 210 can be twice the frequency of a maximum RF frequency of the wideband spectrum received by the remote unit 108. In some aspects, the sampling rate of the ADC 210 can be configured based on one or more of a dynamic range of the ADCs and a data rate of the communication link 220, as described above with respect to FIG. 2.

The process 1000 also involves providing the digital RF signals from a remote unit to a unit in communication with a base station, as depicted in block 1006. For example, one or more of the wideband remote units 108a-n can transmit the digital RF signals generated from the received wideband RF signals to the unit 104 via a communication link 220, as described above with respect to one or more of the examples in FIGS. 2 and 3.

The process 1000 also involves mitigating the digital RF signals corresponding to the leaked downlink RF signals in a combined uplink signal to be transmitted to the base station, as depicted in block 1008. For example, the unit 104 can use the non-duplexer isolation sub-system 404 to filter, exclude, cancel, attenuate, or otherwise mitigate spurious signals from a combined uplink signal, as described above with respect to one or more of the examples in FIGS. 4-7. In some aspects, one or more devices of the unit 104 (e.g., the non-duplexer isolation sub-system 404) can filter a digital RF signal (e.g., a digital signal corresponding to a leaked downlink signal) from a combined uplink signal generated using one or more uplink signals (e.g., another digital RF signal corresponding to an uplink RF signal received by the remote unit 108. In additional or alternative aspects, one or more devices of the unit 104 (e.g., the non-duplexer isolation sub-system 404) can cancel or otherwise mitigate a digital RF signal (e.g., a digital signal corresponding to a leaked downlink signal) from a combined uplink signal generated using one or more uplink signals (e.g., another digital RF signal corresponding to an uplink RF signal received by the remote unit 108. In additional or alternative aspects, one or more devices of the unit 104 (e.g., the non-duplexer isolation sub-system 404) can mute or otherwise attenuate a digital RF signal (e.g., a digital signal corresponding to a leaked downlink signal) from a combined uplink signal generated using one or more uplink signals (e.g., another digital RF signal corresponding to an uplink RF signal received by the remote unit 108.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A wideband remote unit of a digital antenna system that includes a unit in communication with a base station, the remote unit comprising: a downlink path, wherein the wideband remote unit is configured to wirelessly transmit a downlink RF signal from the downlink path; and an uplink path, wherein the wideband remote unit is configured to process a wideband composite uplink signal comprising an uplink RF signal wirelessly received from a user by the wideband remote unit and a leaked downlink RF signal, wherein the leaked downlink RF signal is a signal component of the downlink RF signal wirelessly transmitted by the wideband remote unit and leaked into the uplink path; a converter associated with uplink path and configured with a dynamic range suitable to digitize both the uplink RF signal and the leaked downlink RF signal of the wideband composite uplink signal, the converter further configured to convert the composite uplink signal to a digital representation of the uplink RF signal and to a digital representation of the leaked downlink RF signal; and wherein the uplink path is further configured to transmit to the unit of the distributed antenna system in communication with the base station both the representation of the uplink RF signal and the representation of the leaked downlink RF signal.

2. The remote unit of claim 1, further comprising a splitter-combiner configured to couple to an antenna; wherein an output of the downlink path is coupled to the splitter-combiner; wherein an input of the uplink path is coupled to the splitter-combiner; and wherein the leaked downlink RF signal is leaked into the uplink path via the splitter-combiner.

3. The remote unit of claim 1, wherein an uplink signal power of the uplink RF signal has a thermal noise level associated with the wideband remote unit, wherein the converter comprises an analog-to-digital converter, wherein the dynamic range of the converter is a function of a dynamic range of the analog-to-digital converter, wherein the minimum value of the dynamic range of the converter corresponds to the thermal noise level and the maximum value of the dynamic range of the converter corresponds to a downlink signal power of the downlink RF signal.

4. The remote unit of claim 1, wherein the dynamic range of the converter is based on a data rate for a digital communication link between the wideband remote unit and the unit.

5. The remote unit of claim 4, wherein the converter comprises at least one analog-to-digital converter configured with a sampling rate corresponding to a maximum RF frequency of the composite uplink signal and the data rate for the digital communication link.

6. The remote unit of claim 1, wherein the downlink RF signal comprises a first multiple-input, multiple-output data stream received from the unit.

7. A distributed antenna system comprising: a first unit of the distributed antenna system in communication with a base station; a second unit of the distributed antenna system in communication with the first unit, the second unit comprising: a downlink path, wherein the second remote unit is configured to wirelessly transmit a downlink RF signal from the downlink path; and an uplink path, wherein the second unit is configured to process a wideband composite uplink signal comprising an uplink RF signal wirelessly received from a user by the second unit and a leaked downlink RF signal, wherein the leaked downlink RF signal is a signal component of the downlink RF signal wirelessly transmitted by the second unit that is leaked received into the uplink path; a converter associated with uplink path and configured with a dynamic range suitable to digitize both the uplink RF signal and the leaked downlink RF signal of the wideband composite uplink signal, the converter further configured to convert the composite uplink signal to a digital representation of the uplink RF signal and to a digital representation of the leaked downlink RF signal; and wherein the uplink path is further configured to transmit to the unit of the distributed antenna system in communication with the base station both the representation of the uplink RF signal and the representation of the leaked downlink RF signal.

8. The distributed antenna system of claim 7, wherein the second unit further comprises a splitter-combiner configured to couple to an antenna; wherein an output of the downlink path is coupled to the splitter-combiner; wherein an input of the uplink path is coupled to the splitter-combiner; and wherein the leaked downlink RF signal enters the uplink path via the splitter-combiner.

9. The distributed antenna system of claim 7, wherein the first unit comprises a non-duplexer isolation sub-system configured to mitigate the representation of the leaked downlink RF signal.

10. The distributed antenna system of claim 7, wherein an uplink signal power of the uplink RF signal has a thermal noise level associated with the wideband remote unit, wherein the converter comprises an analog-to-digital converter, wherein the dynamic range of the converter is a function of a dynamic range of the analog-to-digital converter, wherein the minimum value of the dynamic range of the converter corresponds to the thermal noise level and the maximum value of the dynamic range of the converter corresponds to a downlink signal power of the downlink RF signal.

11. The distributed antenna system of claim 10, wherein the dynamic range of the converter is based on a data rate for a digital communication link between the first unit and the second unit.

12. The distributed antenna system of claim 11, wherein the analog-to-digital converter has a sampling rate corresponding to a maximum RF frequency of the wideband composite uplink signal and the data rate for the digital communication link.

13. The distributed antenna system of claim 7, wherein the first unit is configured to mitigate representation of the leaked downlink RF signal by at least one of: filtering the representation of the leaked downlink RF signal from the wideband composite uplink signal; cancelling the representation of the leaked downlink RF signal from the wideband composite uplink signal; or attenuating the representation of the leaked downlink RF signal.

14. The distributed antenna system of claim 7, wherein the first unit is configured to mitigate the representation of the leaked downlink RF signal by: correlating a downlink signal traversing the downlink path with a signal component traversing the uplink path; generating a cancellation signal corresponding to the representation of the leaked downlink RF signal based on correlating the downlink signal traversing the downlink path with the signal component traversing the uplink path; and combining the cancellation signal with a combined uplink signal generated from the representation of the uplink RF signal.

15. The distributed antenna system of claim 7, wherein the downlink RF signal comprises a first multiple-input, multiple-output data stream received from the first unit, wherein the distributed antenna system further comprises: a third unit configured to: wirelessly transmit an additional downlink RF signal comprising a second multiple-input, multiple-output data stream, wherein an additional leaked downlink RF signal is obtained from the additional downlink RF signal wirelessly transmitted by the third unit, and transmit a third digital RF signal to the first unit, wherein the third digital RF signal is generated from the additional leaked downlink RF signal, wherein the first unit is further configured to mitigate the third digital RF signal.

16. A method for a wideband remote unit of a digital antenna system that includes a unit in communication with a base station, the method comprising: wirelessly transmitting a downlink RF signal from a downlink path of a remote antenna unit; receiving a wideband composite uplink signal at an uplink path of the remote antenna unit, the wideband composite uplink signal comprising an uplink RF signal wirelessly received from a user by the wideband remote unit and a leaked downlink RF signal, wherein the leaked downlink RF signal is a signal component of the downlink RF signal wirelessly transmitted by the wideband remote unit and leaked into the uplink path; converting the composite uplink signal to a digital representation of the uplink RF signal and to a digital representation of the leaked downlink RF signal, wherein the uplink path is configured with a dynamic range suitable to digitize both the uplink RF signal and the leaked downlink RF signal of the wideband composite uplink signal; transmitting to the unit of the distributed antenna system in communication with the base station both the representation of the uplink RF signal and the representation of the leaked downlink RF signal.

17. The method of claim 16, the remote antenna unit further comprising a splitter-combiner configured to couple to an antenna; wherein an output of the downlink path is coupled to the splitter-combiner; wherein an input of the uplink path is coupled to the splitter-combiner; and wherein the leaked downlink RF signal is leaked into the uplink path via the splitter-combiner.

18. The method of claim 16, further comprising: mitigating the representation of the leaked downlink RF signal at the unit.

19. The method of claim 18, wherein mitigating the representation of the leaked downlink RF signal comprises at least one of: filtering the representation of the leaked downlink RF signal from the wideband composite uplink signal; cancelling the representation of the leaked downlink RF signal from the wideband composite uplink signal; or attenuating the representation of the leaked downlink RF signal.

20. The method of claim 18, wherein mitigating the representation of the leaked downlink RF signal comprises: correlating a downlink signal traversing the downlink path with a signal component traversing the uplink path; generating a cancellation signal corresponding to the representation of the leaked downlink RF signal based on correlating the downlink signal traversing the downlink path with the signal component traversing the uplink path; and combining the cancellation signal with a combined uplink signal generated from the representation of the uplink RF signal.

* * * * *